United States Patent
Petersen et al.

(10) Patent No.: US 6,345,076 B1
(45) Date of Patent: Feb. 5, 2002

(54) RECEIVER FOR A DIGITAL TRANSMISSION SYSTEM

(75) Inventors: Jürgen Petersen, Nürnberg; Robert Schober, Erlangen; Wolfgang Gerstacker, Nürnberg; Johannes Huber, Langensendelbach, all of (DE)

(73) Assignee: U.S. Phillips Corporation, New York, NY (US)

( * ) Notice: Subject to any disclaimer, the term of this patent is extended or adjusted under 35 U.S.C. 154(b) by 0 days.

(21) Appl. No.: 09/299,528

(22) Filed: Apr. 26, 1999

(30) Foreign Application Priority Data

May 30, 1998 (DE) .......................................... 198 24 408

(51) Int. Cl.$^7$ .............................. H03D 1/00; H04L 27/06

(52) U.S. Cl. ........................................ 375/341; 375/229

(58) Field of Search ................................. 375/229, 254, 375/285, 316, 340, 341, 346, 350, 262, 232, 224; 714/794, 795

(56) References Cited

U.S. PATENT DOCUMENTS 4,656,648 A * 4/1987 Vallet
5,818,876 A * 10/1998 Love ........................... 375/341
5,867,531 A * 2/1999 Shiino et al.

(List continued on next page.)

OTHER PUBLICATIONS

By, John G. Proakis "Digital Communications", 3$^{RD}$ Edition, McGraw–Hill International Editions, 1995,PP. 274.
By Ali Masoomzadeh & Subarayan Pasupathey, "Nonlinear Equalization Of Multipath Fading Channels With Noncoherent Demodulation" IEEE Journal On Selected Areas In Communications, vol. 14, No. 3, Apr. 1996, pp. 512–520.
By Adachi F, Entitled: "MLSE Differential Phase Detection for M–ary DPSK" IEE Proceedings: Communications, Institution of Electrical Engineers, GB, BD. 141, NR. 6, Dec. 1, 1994. pp. 407–412.
Kiasaleh K. et al.: Entitled: "Multiple–Symbol Differential Detection of DQPSK and DPSK Mobile Communication System Impaired by Oscillator Phase Noise" IEEE Global Telecommunications Conference, Phoenix, Arizona, Nov. 3–8, 1997, Global Telecommunications Conference. (Globecom), New York IEEE, US BD. 3, Nov. 3, 1997. pp. 1215–1219.
By Freebersyser J.A. et al., Entitled: "Non–Redundant Error Correction of Uncoded M–DPSK Using a Mo9dified Viterbi Algorithm and a Sliding Block Non–Coherent Multi–Symbol Dectector" Serving Humanity Through Communications. Supercomm/Icc. New Orleans MA1–5 1994, International Conference on Communications (ICC), New York, IEEE, US BD, 2, May 1, 1994, pp. 950–955.

(List continued on next page.)

*Primary Examiner*—Jean Corrielus
(74) *Attorney, Agent, or Firm*—Dicran Halajian

(57) ABSTRACT

The invention relates to a receiver for a digital transmission system with an incoherent transmission method, which receiver includes an equalizer for forming estimates for a sequence of symbols a[k] transmitted by a transmission channel from received symbols r[k] by means of an impulse response h[k] that describes the transmission properties. For improving the receiving quality in an incoherent transmission method and transmission channels having intersymbol interference, it is proposed that the equalizer performs an incoherent maximum likelihood sequence estimation (MLSE) method to determine the estimates â[k] for the sequence of transmitted symbols a[k]. In channels having intersymbol interference, the incoherent MLSE method provides clearly better results than all the known incoherent receiving methods. As against frequency and phase offset, the incoherent MLSE method is considerably more robust than all the known coherent receiving methods. An expensive frequency and phase control may be omitted in this manner.

7 Claims, 2 Drawing Sheets

U.S. PATENT DOCUMENTS 5,887,035 A * 3/1999 Molnar .................... 375/340
5,905,743 A * 5/1999 Ramesh
6,002,716 A * 12/1999 Meyer et al. ............. 375/231
6,034,997 A * 3/2000 Mackentuhm ............ 375/265

OTHER PUBLICATIONS

By Colavolpe G. et al., Entitled: "Non–Coherent Sequence Detection of M–ary PSK" 1997 IEEE International Conference on Communications Montreal, Jun. 8–12, 1997, IEEE International Conference on Communication (ICC), New York, NY: IEEE US, BD. 1, Jun. 8, 1997. pp. 21–25.

By Adachi F., Entitled: "Reduced State Transition Viterbi Differential Detection of M–ary DPSK Signals" Electronic Letters, IEE Stevenage, GB BD. 32, NR. 12, Jun. 6, 1996. pp. 1064–1066.

* cited by examiner

RECEIVER FOR A DIGITAL TRANSMISSION SYSTEM

FIELD OF THE INVENTION

The invention relates to a receiver for a digital transmission system with an incoherent transmission method, which receiver includes an equalizer for forming estimates for a sequence of symbols a[k] transmitted by a transmission channel from received symbols r[k] by means of an impulse response h[k] that describes the transmission properties.

The invention further relates to an equalizer for a digital transmission system with an incoherent transmission method and to a mobile radiotelephone for a digital transmission system with an incoherent transmission method.

BACKGROUND OF THE INVENTION

Such receivers are used in digital transmission systems, for example, in the digital mobile radiotelephone according to various international standards, which transmission systems comprise at least a transmitter, a transmission channel and a receiver. A data source in the transmitter (for example, a microphone with an A/D converter in a mobile radiotelephone) generates a sequence of binary symbols d[i]∈{0;1} which are subsequently modulated by means of an MDPSK (M-ary Differential Phase Shift Keying) modulation method. In a QPSK modulation (Quarternary Phase Shift Keying, with M=4), for example, two successive bits (00,01,10,11) in a mapper are shown on a QPSK symbol a[k]. These symbols are differentially coded in a precoder, so that symbols b[k]=a[k]•b[k−1] evolve. As a result, the symbols are not determined by the absolute phase position of the carrier frequency, but by the difference from the phase position of the previous symbol, which can be used in a receiver having an incoherent receiving method. The determination of an absolute phase position leads to problems during the demodulation, which problems are caused by phase ambiguities. With a quarternary DPSK modulation, there are relative phase differences between successive symbols b[k] of 0°, 90°, 180° and −90° (45°, 135°, −135 and −45° respectively, with π/4 QDPSK) in dependence on the symbols 00,01,10 and 11. When a differential precoding of the symbols (QDPSK) is used, this is also known as an incoherent transmission method.

The sequence of symbols b[k] is transmitted by a possibly time-variant transmission channel which has distortion and noise. In a receiver input stage the received symbol r(t) is sampled with a symbol clock T, the sampling instant $kT+t_0$ being determined by a synchronizer. The discrete sequence r'[k]=r($kT+t_0$) is obtained then. A subsequent standardization with the average efficiency of the received symbols r'[k] leads to the symbols r[k] which have the average efficiency 1. The symbols r[k] may be described with a desired symbol y[k] to which an interference portion n[k] is added. This noise sequence n[k] may be assumed to be white Gaussian noise.

By means of an equalizer, a receiver estimates the sequence of symbols â[k−$k_{max}$] from the sampled values of the received signal, while this sequence must be a maximum match for the transmitted sequence a[k] except for the delay $k_{max}$. Estimates for the data sequence d[i] can be determined from the symbols â[k−$k_{max}$] by means of a conversion of the mapping. The description of the formation of the transmission pulse, high-frequency modulation and transmission gain and, at the receiving end, the high-frequency demodulation and receiving filtering is omitted for clarity and only the baseband model is represented. The transmission properties of the whole transmission channel between the transmitter-end symbols b[k] and the received symbols r[k] are combined, in a time-invariant channel, to an overall impulse response h(t) or h[k] respectively, in the symbol clock model. In the case of a time-variant channel, that is to say, when the properties depend on time, the transmission properties of the channel are described by the channel impulse response h(τ,t). In the following, this dependence on time will not be taken into account to clarify the representation. In the channel impulse response h(t) are included as transmission properties also the Inter-Symbol Interference (ISI) of the linearly distorting transmission channel, which ISI is caused by multipath propagation of the signal. The mixing of the baseband signal with a high-frequency carrier signal in non-synchronized Local Oscillators (LO) leads to a phase and frequency offset which produces additional intersymbol interference upon reception.

In an incoherent receiver, the absolute phase position of a received symbol is not determined within the symbol interval. Only the relative phase difference of successive symbols is determined. This is habitually achieved by differentiating the sampling frequency of the received signals by means of a multiplication by the conjugate-complex symbol sampling frequency shifted by one symbol interval. The absolute phase position of the carrier frequency is then eliminated from the sequence of desired signals. Also Rayleigh fading occurring in mobile radiotelephone systems causes a frequency offset of the received signal to occur, as a result of which an incoherent receiving method is advantageous.

When receivers with incoherent receiving methods have transmission channels in which a symbol received in interval k is also influenced by L−1 previous symbols, they have high bit error rates when the received symbols are detected. L denotes the number of symbols superimposed in the interval k as a result of multipath propagation, for example, which may be described with a memory length L−1 of the transmission channel (having a discrete channel impulse response of h=[h(0),h(1), ... h(L−1)]) and leads to intersymbol interference (ISI). The superpositioning leads to a sequence of desired symbols y[k] which are described by the sum $$y[k] = \sum_{l=0}^{L-1} h[l] \cdot b[k-l]$$

In "Digital Communications", $3^{rd}$ Edition, MgGraw-Hill International Editions, 1995, by John G. Proakis, is described a receiving method for differential. PSK (DPSK) with channels that have no pulse interference. From page 274 onwards is shown the reception of differentially coded, phase-modulated signals. As appears from the processing shown of the received symbol r(t), the phase position of the carrier signal need not be estimated. With the multiplication of the sample value r[k] of a received signal r(t) by the conjugate-complex value of the previous value r*[k−1], the phase position of the carrier signal disappears from the defining equation, so that only the difference between the phase angle of the signal at instant k and the phase angle of the previous signal (k−1) needs to be detected. Consequently, this MDPSK method is also referred to as an incoherent receiving method. Since the channel memory is discarded for this method, the bit error rate of channels having intersymbol interference is very high.

From the article "Nonlinear Equalization of Multipath Fading Channels with Noncoherent Demodulation", Ali Masoomzadeh and Subarayan Pasupathy, IEEE Journal on Selected Areas in Communications, vol. 14, no. 3, April 1996, pp. 512–520 is known an equalizer for MDPSK-modulated signals. For these MDPSK signals is then proposed a receiving method with a distorting transmission channel and non-linear intersymbol interference (ISI), which interference arises from the differentiation in the receiver. In the incoherent receiver a decision feedback equalization DFE is used for the detection. Owing to the non-linear distortions as a result of the differentiation, the conventional DFE cannot be used. Therefore, it is necessary to implement a modified DFE method which also takes the non-linear distortion into account in the "Digital Communications" mentioned above, non-linear DFE equalization for an MDPSK signal, for which equalization the equalizer in the receiver follows the differential decoder. This equalizer may equalize the non-linear ISI produced by the differential decoder. Such an incoherent receiving method clearly provides poorer results in transmission channels without frequency and phase offset than a coherent method. There may be detected a loss of more than 8 dB in the power efficiency compared with an optimum coherent MLSE receiver.

SUMMARY OF THE INVENTION

Therefore, it is an object of the invention to improve the receiving quality, that is, the correspondence of the estimated symbols with the transmitted symbols in an incoherent transmission method and in transmission channels having intersymbol interference.

The object is achieved in that for determining the estimates $â[k]$ for the sequence of transmitted symbols $a[k]$ the equalizer performs an incoherent maximum-likelihood sequence estimation (MLSE) method. According to the MLSE method, the estimates $â[k]$ are determined by means of a defined probability density function relating to a sequence of received symbols $r[k]$ with a presupposed, undisturbed sequence of desired symbols $y[k]$, while the absolute phase of the desired symbol sequence $y[k]$ or the incoherence need not be taken into account. The undisturbed sequence of desired symbols $y[k]$ is formed by means of the channel impulse response $h[k]$ assumed to be known, except for the absolute phase, for each possible sequence of transmitted symbols $a[k]$ formed by $N+1$ symbols. For determining the transmitted sequence of symbols $a[k]$, the probability of correspondence of the sequence of symbols $y[k]$ with the received sequence of symbols $r[k]$ is maximized by means of the probability density function, while the absolute phase of $y[k]$ with the incoherent MLSE method has no effect on the maximization. This maximization leads to a minimum error probability sequence which then forms the sequence of estimates $â[k]$ for the sequence of transmitted symbols $a[k]$. This means that the correspondence of the sequence $â[k]$ with the sequence $a[k]$, which is optimum with the incoherent transmission method, is achieved. As a strictly monotonous exponential function is used for the probability density function, a simpler minimization of a metric $\lambda$ can be carried out instead of the maximization. The optimum, incoherent metric $\lambda$ makes the best estimate of the sequence of transmitted symbols $a[k]$ possible. The equalizer may comprise, for example, a digital signal processor or another processor to which the received symbols $r[k]$ and the overall impulse response $h[k]$ can be applied and which carries out the necessary computations for determining the estimates $â[k]$ for the transmitted symbols $a[k]$.

In an advantageous embodiment of the receiver, the equalizer divides the received symbols $r[k]$ into at least two symbol blocks having at least two symbols each, forms symbol blocks overlapping by at least one symbol $r[k]$ and forms the estimates $â[k]$ for the transmitted symbols $a[k]$ symbol block by symbol block. Since the optimum metric $\lambda$ does not have a recursive structure, the evaluation of this metric $\lambda$ is very costly. A cost-effective realization is made possible by the formation of symbol blocks. For this purpose, the equalizer writes the received symbols $r[k]$, for example, into a buffer memory and forms the symbol blocks in that it consecutively reads a definable number of symbols (a symbol block) and applies them to the estimation method. For example, a digital memory may then be provided as a buffer, while the digital signal processor takes over control. Preferably, memory and processor are integrated into one IC. As a result of the buffering the sequence of the received symbols $r[k]$ is thus subdivided into $N_g$ symbol blocks having a length of $N_B>1$ symbols each. For determining estimates, $N+L-1$ symbols are to be considered, so that $N_g(N_B-1)=N+L-1$ holds. Consecutive symbol blocks overlap by at least one symbol, that is to say, the last symbols of a symbol block are repeated at the beginning of the next symbol block. This is necessary for rendering one reference phase for each symbol block available for the incoherent receiving method used. The subdivision into symbol blocks causes a sub-optimum metric (block metric) to evolve from the optimum metric, while the minimization of the sub-optimum metric corresponds to an estimate in symbol blocks. The block metric has a recursive structure, so that a cost-effective realization becomes possible. The reliability of the estimates $â[k]$ and the cost of implementation are enhanced when the symbol block length increases, so that a compromise between power efficiency and cost can be reached.

In a preferred embodiment of the invention, the equalizer carries out the estimation in symbol blocks of the sequence of transmitted symbols $a[k]$ by means of a Viterbi algorithm. The block metric realized by means of the known Viterbi algorithm makes a cost-effective implementation possible as the advantages of the recursive structure are used. Each symbol block of the sequence of received symbols $r[k]$ then corresponds to a step in time in a trellis diagram allocated to the Viterbi algorithm.

Further preferred embodiments are defined in the remaining dependent claims. More particularly, simulations have shown that a subdivision of the sequence of received symbols $r[k]$ by the equalizer into symbol blocks of 3 or 2 symbols is advantageous. Furthermore, the receiver according to the invention is arranged highly effectively when the equalizer forms symbol blocks which overlap by exactly one symbol $r[k]$.

The object of the invention is also achieved by the equalizer and the mobile radiotelephone having the features according to the invention.

These and other aspects of the invention will be apparent from and elucidated with reference to the embodiments described hereinafter.

DETAILED DESCRIPTION OF THE INVENTION

Figure 1:
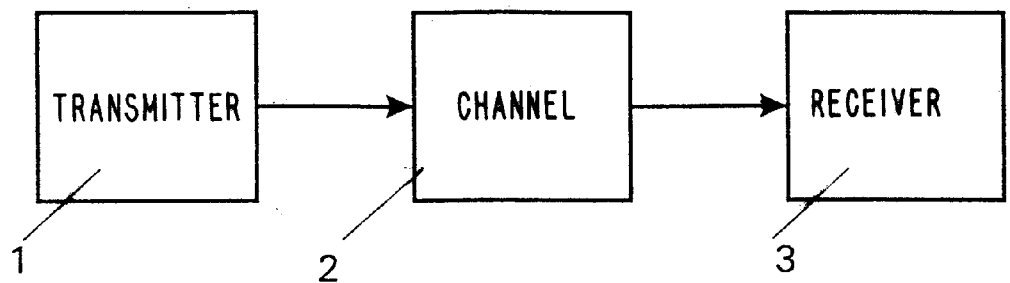
FIG. 1 shows a simplified block diagram of a transmission system.
Figure 2:
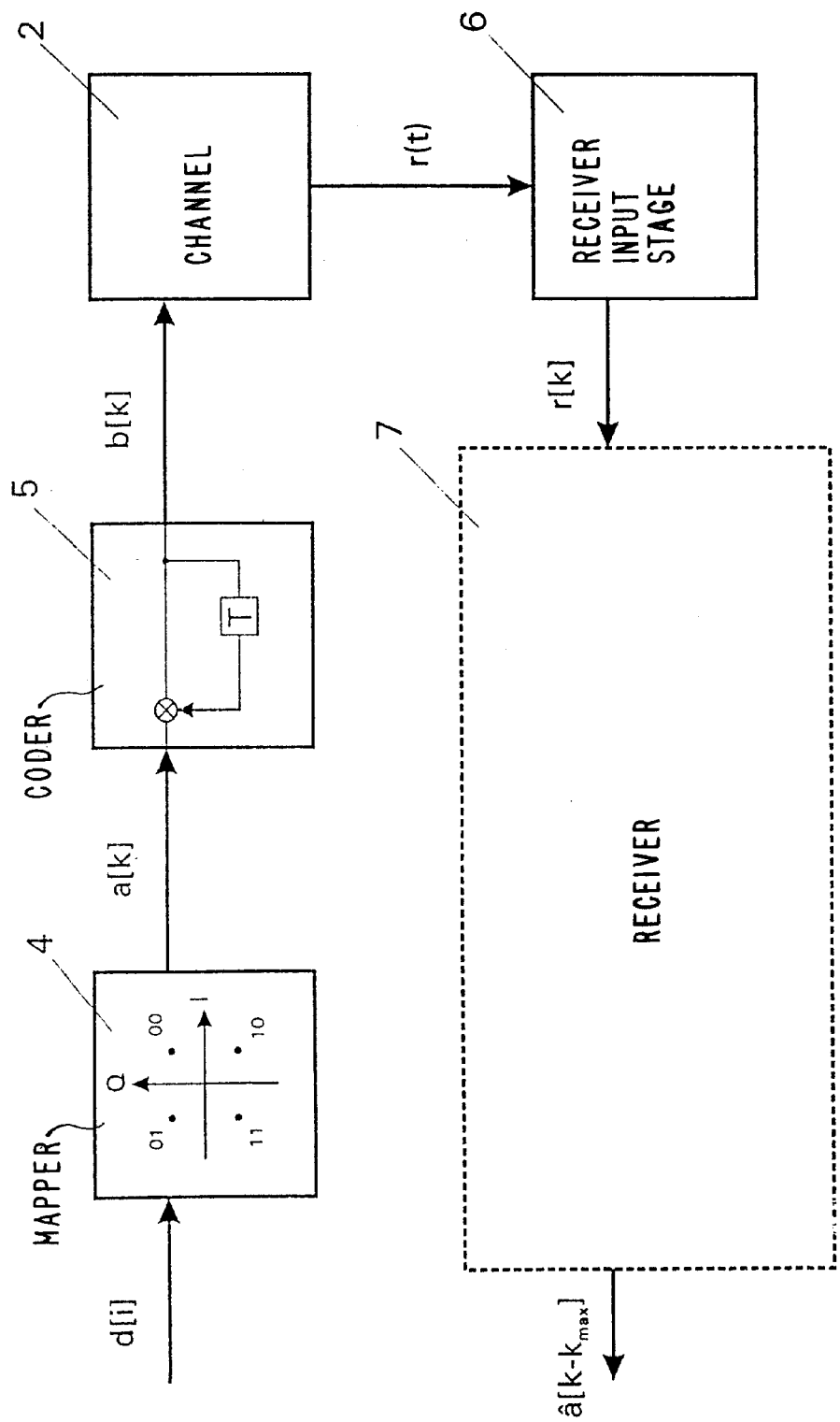
FIG. 2 shows a block diagram of a transmission system for the digital mobile radiotelephone in the baseband model.

In FIG. 1 is shown a simplified block diagram of a digital transmission system according to the invention, comprising a transmitter 1, a transmission channel 2 and a receiver 3. The FIG. 2 shows in more detail a block diagram of a baseband model of the transmission system. A microphone having an A/D converter in the transmitter 1 of the mobile radiotelephone generates a sequence of binary symbols $d[i] \in \{0;1\}$ which are modulated by a QPSK (Quarternary Phase-Shift Keying) modulation. Two successive bits (00, 01,10,11) in a mapper 4 are then shown on a QPSK symbol a[k]. These transmit symbols a[k] are precoded in a differential coder 5, so that symbols $b[k]=a[k] \cdot b[k-1]$ evolve. As a result, according to an incoherent method the symbols a[k] are not determined by the absolute phase position of the carrier frequency, but by the difference between the phase position of b[k] and that of the previous symbol b[k−1]. In the quarternary DPSK modulation there are relative phase differences b[k] of 0°,90°,180° and −90° between successive symbols in dependence on the symbols 00,01,10 and 11.

The transmit signal formed from the symbols b[k] by means of a transmit pulse generator having an impulse response $h_s(t)$ is transmitted by a possibly time-variant transmission channel 2. The channel impulse response $h_c(t)$ also takes intersymbol interference (ISI) into account. In a receiver input stage 6, the received symbol r(t) is filtered, sampled with a symbol clock T, subsequently standardized and rotated back as required, so that a sequence of received symbols r[k] evolves. The resulting overall impulse response for the transmission from transmission filter $h_s(t)$, channel $h_c(t)$ and receiving filter is referenced h(t), h[k] respectively, in the symbol clock model. The overall impulse response can be estimated in customary manner by means of a known training sequence, for which it is not necessary, however, to know its absolute phase. The sequence r[k] is applied to a receiver 7 which forms estimates $â[k-k_{max}]$ for the transmitted symbols a[k] by means of the estimated overall impulse response h[k], where $k_{max}$ describes a delay of the symbols.

Figure 3:
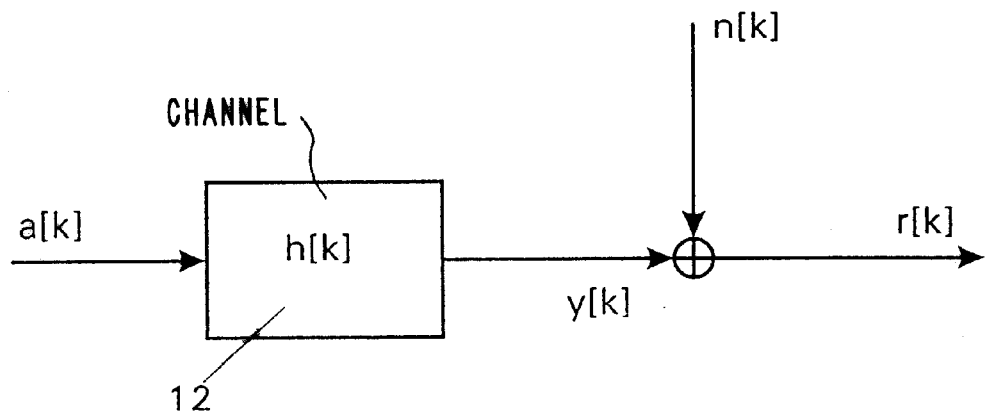
FIG. 3 shows a block diagram for a symbol clock model of the transmission system.

In FIG. 3 is represented the symbol clock model for the transmission system, in which the signals occurring in the transmission system are described as a symbol at clock instant k. The transmitted symbols a[k] are transmitted by an aggregate transmission channel 12 having the aggregate impulse response h[k], so that noiseless received symbols y[k] evolve. These symbols y[k] are superimposed by a noise portion n[k] while there is assumed that the symbols n[k] are subdivided in an uncorrelated manner and in accordance with a Gaussian curve. The superimposed symbols y[k] and n[k] form the received symbols r[k].

The sampled received signal r[k] in the case of a transmission with MDPSK by a linearly distorting channel which generates intersymbol interference (ISI) can be represented in a discrete-time manner in accordance with $$r[k] = e^{j\theta} \sum_{\nu=0}^{L-1} h[\nu] \cdot b[k-\nu] + n[k], \quad (1)$$

after a filtering to limit the noise bandwidth and after a sampling with the symbol clock, where $k \in Z$ describes the discrete time and h[k] the discrete-time impulse response having length L of the overall transmission system. All the signals are here described based on their equivalent complex baseband signals, while the nominal carrier frequency is used as a reference frequency. The differentially precoded MDPSK symbols b[k] are obtained from the MDPSK symbols a[k] with the aid of the equation $$b[k]=a[k] \cdot b[k-1] \quad (2)$$

with $a[\cdot] \in \{e^{j2\pi i/M+\lambda)}|i=0, \ldots, M-1; \lambda \in \{0,\pi/M\}\}$. The symbols a[k] are thus taken from an M-value symbol alphabet (for example, M=4, $\lambda=\pi/4$ with a mobile radiotelephone according to United States Standard IS-136). Only the differential precoding according to equation (2) makes it possible to use an incoherent receiver. The noise sequence n[k] is assumed to be white and Gaussian noise. In mobile radiotelephone systems such as IS-54, IS-136 or PDC (Japanese standard), the receiving filter in the receiver input stage has a so-called Wurzel-Nyquist characteristic from which the non-correlation of successive interference sample values n[k] follows. If the receiving filter has a different characteristic, an additional whitening filter can be provided. θ denotes an arbitrary, but constant phase which is satisfied only approximately in channels which have a carrier frequency offset. Nevertheless, the incoherent receiver is very robust to frequency offset, because the phase rotations caused by the frequency offset are not added together in the incoherent receiver over all the symbols, which is different from coherent receivers.

An optimum incoherent receiving method in the sense of the maximum likelihood criterion (ML) cannot be implemented in a simple manner in its original form. A modification of the optimum method leads to a multisymbol Maximum Likelihood Sequence Estimation (MLSE) method, which can be realized in a cost-effective manner with the aid of the known Viterbi algorithm.

In the following an optimuim incoherent metric in the sense of the ML criterion is derived, which metric makes it possible to determine the transmitted MPSK sequence $<a[k]>_1^N$ with a maximum likelihood. It should be pointed out in this respect that the MDPSK sequence $<a[k]>_1^N$, belongs to the MPSK sequence $<b[k]>_0^N$. b[0] is then only necessary for determining the reference phase and, therefore, does not carry information. All in all, there are $M^N$ possible, different transmission sequences $<a[k]>_1^N$. For distinguishing the individual sequences, they are referenced by the index $\mu(1) \leq \mu \leq M^N$): $<a_\mu[k]>_1^N$ or $<b_\mu[k]>_0^N$, respectively. To each possible transmission sequence belongs a respective undistorted received sequence $<y_\mu[k]>_0^{N+L-1}$. The lengthening of the received sequence from N to N+L−1 is caused by the fact that the channel has a memory length of L−1 symbols. $y_\mu[k]$ is obtained from the equation:

$$y_\mu[k] = \sum_{\nu=0}^{L-1} h[\nu] \cdot b_\mu[k-\nu] \quad (3)$$

For the incoherent MLSE estimate, the sequence $<r[k]>_0^{N+L-1}$ of the received symbols is to be considered. As is customary in MLSE methods, there is assumed that the symbols $b_\mu[k]$ for k<0 and k>N, are known. For a simplified mathematical description of the method it is useful to introduce the following definitions:

$$\vec{r} \equiv (r[0],r[1], \ldots, r[N+L-1])^T \quad (4)$$

$$\vec{y}_\mu \equiv (y_\mu[0],y_\mu[1], \ldots, y_\mu[N+L-1])^T \quad (5)$$

With these definitions and equation (1) the specific Gaussian probability density function $f_{\vec{r}|\vec{y},\theta}(\vec{r}|\vec{y}_\mu,\theta)$ referring to the complex receiving vector $\vec{r}$ with an assumed vector $\vec{y}_\mu$ of the assumed desired signal and assumed carrier phase difference θ can be denoted as:

$$f_{\vec{r}|\vec{y},\theta}(\vec{r}|\vec{y}_\mu,\theta) = \frac{1}{(\pi\sigma_n^2)^{N+L}} \exp\left(-\frac{\|\vec{r}-e^{j\theta}\cdot\vec{y}_\mu\|^2}{\sigma_n^2}\right). \quad (6)$$

$\sigma_n^2$ then denotes the variance of the noise n[k]. $\|.\|^2$ denotes the $L_2$ standard of the vector represented by the dot. The direct maximization of $f_{\vec{r}|\vec{y},\theta}(\vec{r}|\vec{y}_\mu,\theta)$ referring to the transmission sequence number $\mu$ is impossible, because this function still depends on the unknown phase θ. With incoherent receiving methods, θ may be assumed to be uniformly distributed in the interval $[-\pi,\pi]$. In this manner it is possible to form the marginal distribution $f_{\vec{r}|\vec{y}}(\vec{r}|\vec{y}_\mu)$ with respect to θ:

$$f_{\vec{r}|\vec{y}}(\vec{r}|\vec{y}_\mu) = \frac{1}{2\pi}\int_{-\pi}^{\pi} f_{\vec{r}|\vec{y},\theta}(\vec{r}|\vec{y}_\mu,\theta)d\theta. \quad (7)$$

This leads to $$f_{\vec{r}|\vec{y}}(\vec{r}|\vec{y}_\mu) = \frac{1}{(\pi\sigma_n^2)^{N+L}} \quad (8)$$

$$\exp\left(-\frac{1}{\sigma_n^2}\sum_{k=0}^{N+L-1}(|r[k]|^2+|y_\mu[k]|^2)\right) \cdot I_0\left(\frac{2}{\sigma_n^2}\left|\sum_{k=0}^{N+L-1} r[k]\cdot y_\mu^*[k]\right|\right).$$

The maximization $f_{\vec{r}|\vec{y},\theta}(\vec{r}|\vec{y}_\mu)$ with respect to $\mu$ makes the estimation possible of the transmitted sequence with minimum error probability. Via several modifications, the maximization of $f_{\vec{r}|\vec{y}}(\vec{r}|\vec{y}_\mu)$ can be shown to be equivalent to the minimization of the metric $$\lambda_{N+L}^\mu = \frac{1}{\sigma_n^2}\sum_{k=0}^{N+L-1}|y_\mu[k]|^2 - \ln\left(I_0\left[\frac{2}{\sigma_n^2}\left|\sum_{k=0}^{N+L-1} r[k]\cdot y_\mu^*[k]\right|\right]\right) \quad (9)$$

The first type of zero-order Bessel function $I_0(\bullet)$ occurring in equation (9) causes problems when the metric is realized. However, it is possible to utilize the approximation $\ln(I_0(x))\approx x-2.4$. Via simulations there may be established that the use of this approximation does not cause any measurable loss of the efficiency of the method. When the approximation is used and after additional modifications, the metric according to equation (9) may be brought to the form:

$$\lambda_{N+L}^\mu = \sum_{k=0}^{N+L-1}|y_\mu[k]|^2 - 2\left|\sum_{k=0}^{N+L-1} r[k]\cdot y_\mu^*[k]\right| \quad (10)$$

This metric is an optimum incoherent MLSE metric. It allows of the best possible estimate of the transmitted symbol sequence when the absolute phase of the received symbols r[k] is unknown.

Since the metric according to equation (10), however, does not have a recursive structure, an efficient realization of the metric by means of the Viterbi algorithm is impossible for the time being. To nevertheless make a cost-effective realization possible, the metric can be modified. A suitable modification is represented by the MSMLSE method described in the following.

The reason of the fact that $\lambda_{N+L}^\mu$ cannot be represented recursively lies in the term $$\left|\sum_{k=0}^{N+L-1} r[k]\cdot y_\mu^*[k]\right|$$

of equation (10). For guaranteeing the recursiveness, modifications are to be implemented. the MSMLSE method the term is subdivided into blocks (partial quantities) having length $N_B>1$. The term $$\left|\sum_{k=0}^{N+L-1} r[k]\cdot y_\mu^*[k]\right|$$

is replaced by:

|r[0]·y$_\mu$*[0]+ ... +r[N$_B$−1]·y$_\mu$*[N$_B$−1]|+|r[N$_B$−1]·y$_\mu$*[N$_B$−1]+ ... +r[2(N$_B$−1)]·y$_\mu$*[2

(N$_B$−1)]|+ ... +|r[(N$_g$−1)(N$_B$−1)]·y$_\mu$*[(N$_g$−1) (N$_B$−1)]+ ... +r[N$_g$(N$_B$−1)]·y$_\mu$*[N$_g$(N$_B$−1)]|. (11)

$N_g$ is then the total number of blocks. The condition $N+L-1=N_g(N_B-1)$ must be satisfied. However, in practice this is no limitation, because in most cases $N_B$ must be small (see below) and N can be brought to the desired value by means of several known symbols appended to the information symbols (for example, training sequence symbols when applied to mobile radiotelephones). In equation (11) there may be recognized that the individual blocks always overlap by one received symbol r[k]. This overlapping is necessary for the reference phase to be maintained. It should be pointed out that with the MSMLSE method, an overlapping of more than one symbol is possible. However, this causes the cost of implementation to rise. With the aid of equation (10) and equation (11) is defined as an MSMLSE metric $^{MS}\lambda_{(N_g+1)(N_B-1)}^\mu$:

$$^{MS}\lambda_{(N_g+1)(N_B-1)}^\mu \equiv \sum_{v=0}^{N_g-1}\sum_{k=v(N_B-1)}^{(v+1)(N_B-1)}|y_\mu[k]|^2 - \quad (12)$$

$$2\sum_{v=0}^{N_g-1}\left|\sum_{k=v(N_B-1)}^{(v+1)(N_B-1)} r[k]\cdot y_\mu^*[k]\right|$$

This metric may also be represented recursively:

$$^{MS}\lambda_{(v+1)(N_B-1)}^\mu = \quad (13)$$

$$^{MS}\lambda_{v(N_B-1)}^\mu + \sum_{k=(v-1)(N_B-1)}^{v(N_B-1)}|y_\mu[k]|^2 - 2\left|\sum_{k=(v-1)(N_B-1)}^{v(N_B-1)} r[k]\cdot y_\mu^*[k]\right|$$

The recursiveness of the MSMLSE metric now makes it possible to implement the Viterbi algorithm and thus provide a cost-effective realization. One block then corresponds to a branch in the trellis diagram belonging to the Viterbi algorithm. The Viterbi algorithm requires $M^{L-1}$ states in the MSMLSE method.

Furthermore, transitions occur with each time step $$\frac{M^{L+N_B-2}}{N_B-1}.$$

Compared with a coherent MLSE method, this means an increase by a factor $$\frac{M^{N_B-2}}{N_B-1}$$

According to this, more transitions than with the coherent method are necessary for $N_B>2$. However, when the MSMLSE method is implemented, an expensive accurate frequency and phase control may be omitted because of the incoherence, which omission provides a more cost-effective solution for a moderate block length (for example, $N_B=3$).

Figure 4:
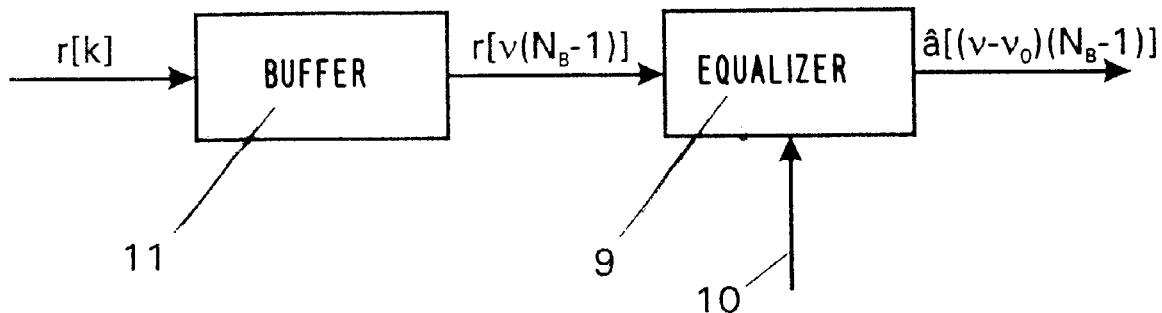
FIG. 4 shows a block diagram of an incoherent receiver having a sequence estimation for a division of sequences of received symbols into symbol blocks.

There may be established that the reliability of the MSMLSE detection is enhanced when the block length increases. Since the cost of implementation rises simultaneously, in practice a compromise must be found between efficiency and cost. The basic structure of the MSMLSE receiver according to the invention is shown in FIG. 4. In a buffer 11 the received symbols r[k] are first combined to a symbol block (vector) $\vec{r}[v(N_B-1)]=r[(v-1)(N_B-1)], \ldots, r[v(N_B-1)]^T$ These symbol blocks are then processed in the equalizer 9 by means of the MSMLSE method described above. For this purpose, it is necessary to know the vector of the discrete-time impulse response coefficients of the transmission system $\vec{h}=(h[0], h[1], \ldots, h[L-1])^T$ 10.

Since the method is incoherent, the phase of $\vec{h}$ need not be known. In known manner, the impulse response is determined by approximation by means of a suitable channel estimation method and applied to the equalizer 9. After a delay of $v_0$ steps, the MSMLSE equalizer 9 then produces the estimates $$\hat{\vec{a}}^{[(v-v_0)(N_B-1)]} = (\hat{a}[(v-1-v_0)(N_B-1)+1], \ldots, \hat{a}[(v-v_0)(N_B-1)])^T$$

of the $N_B-1$ collectively decided symbols.

$\hat{a}[k]$ then denotes an MPSK symbol estimated by the receiver. The delay $v_0$ in methods utilizing the Viterbi algorithm is unavoidable. However, the thumb value $v_0 \approx 5L$ valid for a coherent receiver may be clearly fallen short of without a deterioration of the efficiency being noticeable. For the case where M=4, $N_B=3$ and L=2, which is interesting for mobile radio applications, for example $v_0=2$ is already sufficient.

The proposed receiver offers the following advantages:

1. With channels having no frequency and phase offset, already with a small block length ($N_B=2-3$) the MSMLSE method leads to a slightly poorer efficiency than an optimum coherent MLSE method (loss of about 2–3 dB of efficiency), while the efficiency can be improved when longer blocks are used.

2. The MSMLSE method used with ISI channels produces clearly better results than all the known incoherent receiving methods (already with $N_B=2-3$ about 5–6 dB better than known incoherent methods).

3. As against frequency and phase offset, the MSMLSE method is considerably more robust than all the known coherent receiving methods. An expensive frequency and phase control may be omitted in this manner.

What is claimed is:

1. A receiver for a digital transmission system with an incoherent transmission method, which receiver includes an equalizer for forming estimates â[k] for a sequence of symbols a[k] transmitted by a transmission channel from received symbols r[k] by an impulse response h[k] that describes transmission properties, wherein the equalizer for determining the estimates â[k] for the sequence of transmitted symbols a[k] performs an incoherent maximum likelihood sequence estimation (MLSE) method, wherein the equalizer subdivides the received symbols r[k] into at least two symbol blocks having at least two symbols each, wherein the equalizer forms symbol blocks overlapping by at least one symbol r[k], and wherein the equalizer forms the estimates â[k] for the transmitted symbols a[k] symbol block by symbol block.

2. A receiver as claimed in claim 1, characterized in that the equalizer carries out the estimation of the sequence of transmitted symbols a[k] by means of a Viterbi algorithm.

3. A receiver as claimed in claim 1, characterized in that the equalizer subdivides the sequence of received symbols r[k] into symbol blocks having a length of 3 symbols each.

4. A receiver as claimed in claim 1, characterized in that the equalizer subdivides the sequence of received symbols r[k] into symbol blocks having a length of 2 symbols each.

5. A receiver as claimed in claim 1, characterized in that the equalizer forms symbol blocks overlapping by exactly one symbol r[k].

6. An equalizer for a digital transmission system with an incoherent transmission method for forming estimates â[k] for a sequence of symbols a[k] transmitted by a transmission channel from received symbols r[k] by an impulse response h[k] describing transmission properties, wherein the equalizer performs an incoherent maximum likelihood sequence estimation (MLSE) method for determining the estimates â[k] for the sequence of transmitted symbols a[k], wherein the equalizer subdivides the received symbols r[k] into at least two symbol blocks having at least two symbols each, wherein the equalizer forms symbol blocks overlapping by at least one symbol r[k], and wherein the equalizer forms the estimates â[k] for the transmitted symbols a[k] symbol block by symbol block.

7. A mobile radiotelephone for a digital transmission system with an incoherent transmission method, comprising an equalizer for forming estimates â[k] for a sequence of symbols a[k] transmitted by a transmission channel from received symbols r[k] by means of an impulse response h[k] describing transmission properties, wherein the equalizer performs an incoherent maximum likelihood sequence estimation (MLSE) method for determining the estimates â[k] for the sequence of transmitted symbols a[k], wherein the equalizer subdivides the received symbols r[k] into at least two symbol blocks having at least two symbols each, wherein the equalizer forms symbol blocks overlapping by at least one symbol r[k], and wherein the equalizer forms the estimates â[k] for the transmitted symbols a[k] symbol block by symbol block.

* * * * *